US008082967B2

(12) United States Patent
Zacche et al.

(10) Patent No.: US 8,082,967 B2
(45) Date of Patent: Dec. 27, 2011

(54) POSITIONING DEVICE FOR A TUBULAR LABEL AT A PRE-ESTABLISHED HEIGHT FROM A BOTTLE BOTTOM IN A LABELLING MACHINE

(75) Inventors: Vanni Zacche, Lambardia (IT); Luigi Panzetti, Parma (IT)

(73) Assignee: Sidel Holdings & Technology SA, Pully (CH)

( * ) Notice: Subject to any disclaimer, the term of this patent is extended or adjusted under 35 U.S.C. 154(b) by 913 days.

(21) Appl. No.: 10/592,019

(22) PCT Filed: Feb. 25, 2005

(86) PCT No.: PCT/EP2005/001989

§ 371 (c)(1), (2), (4) Date: Jul. 9, 2007

(87) PCT Pub. No.: WO2005/085072

PCT Pub. Date: Sep. 15, 2005

(65) Prior Publication Data

US 2007/0277933 A1 Dec. 6, 2007

(30) Foreign Application Priority Data

Mar. 8, 2004 (IT) .............................. PR2004A0017

(51) Int. Cl.

| | |
|---|---|
| ***B29C 65/56*** | (2006.01) |
| ***B32B 37/10*** | (2006.01) |
| ***B32B 37/18*** | (2006.01) |
| ***B32B 37/28*** | (2006.01) |
| *B29C 65/50* | (2006.01) |

(52) U.S. Cl. ... 156/582; 156/443; 156/538; 156/DIG. 6; 156/DIG. 37; 156/DIG. 42

(58) Field of Classification Search ............. 156/DIG. 6, 156/DIG. 37, DIG. 42, 443, 538, 582

See application file for complete search history.

(56) References Cited

U.S. PATENT DOCUMENTS 3,784,436 A * 1/1974 Fock et al. .................... 156/334
3,784,438 A * 1/1974 Dullinger ....................... 156/487
4,013,496 A * 3/1977 Amberg .......................... 156/85
(Continued)

FOREIGN PATENT DOCUMENTS

EP 1539588 A1 6/2005
(Continued)

*Primary Examiner* — Sonya Mazumdar
(74) *Attorney, Agent, or Firm* — Pearne & Gordon LLP

(57) ABSTRACT

The invention deals with the field of labelling machines with tubular labels made of heat-shrinking film that are directly formed on the machine starting from coiled film. More precisely, the invention refers to a device (1) or (10) for positioning a tubular label (8) at a pre-established height from a bottle bottom and to means (21) for keeping the label position during the label transfer to an outlet conveyor where a first partial heat-shrinkage occurs. The positioning device is supported by the drum, on which the label is formed, and must allow sliding the bottle inside the formed label.

12 Claims, 2 Drawing Sheets

U.S. PATENT DOCUMENTS

| | | | | | |
|---|---|---|---|---|---|
| 4,199,851 | A | * | 4/1980 | Doherty | 29/235 |
| 4,208,237 | A | | 6/1980 | Heyne | |
| 4,302,275 | A | | 11/1981 | Burmeister et al. | |
| 4,316,762 | A | * | 2/1982 | Martin | 156/488 |
| 4,594,123 | A | * | 6/1986 | Eder | 156/456 |
| 5,415,721 | A | | 5/1995 | Nickey et al. | |
| 5,417,794 | A | * | 5/1995 | Menayan | 156/362 |
| 5,464,495 | A | * | 11/1995 | Eder | 156/456 |
| 7,582,176 | B2 | | 9/2009 | Panzetti | |
| 2006/0113024 | A1 | * | 6/2006 | Panzetti | 156/84 |
| 2008/0110572 | A1 | | 5/2008 | Panzetti | |

FOREIGN PATENT DOCUMENTS

| | | | | |
|---|---|---|---|---|
| IT | PR2002A000049 | | | 6/2005 |
| JP | 49134488 | A | | 12/1974 |
| JP | 01-099935 | A | | 4/1989 |
| WO | WO 2004020291 | A1 | * | 3/2004 |

* cited by examiner

FIG. 2
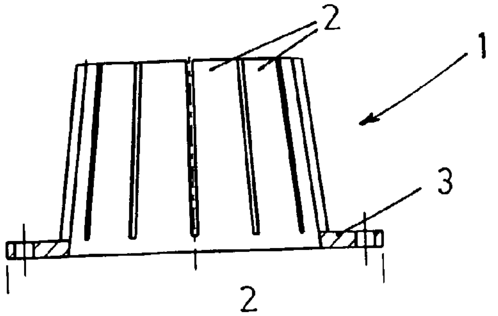
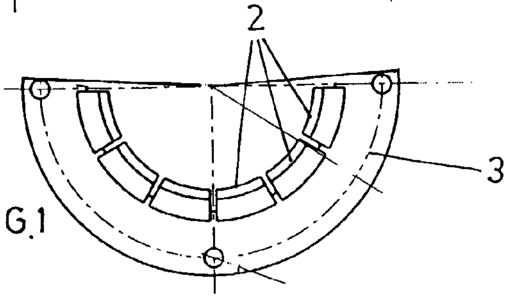
FIG. 1
FIG. 3
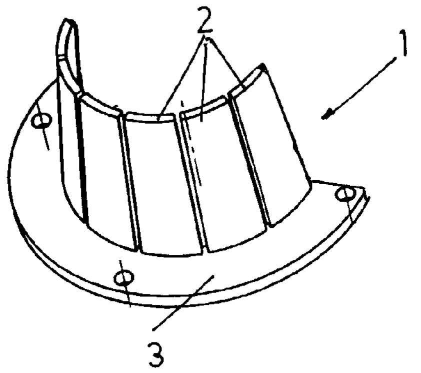
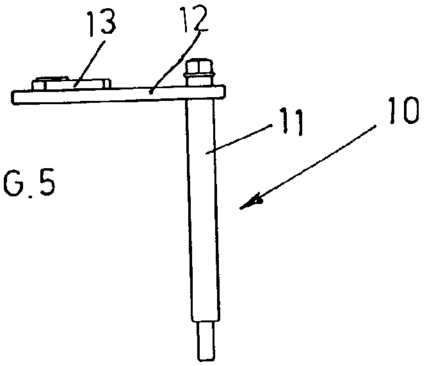
FIG. 5
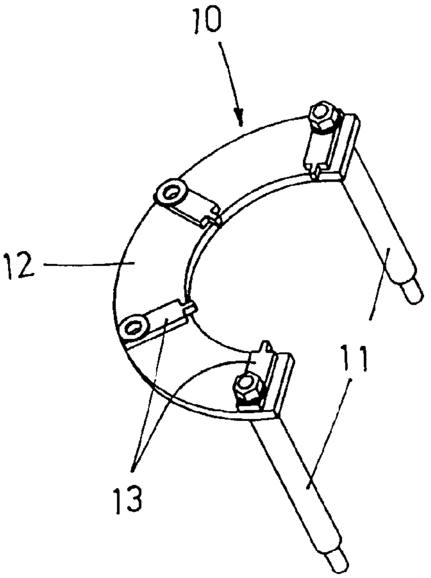
FIG. 6
FIG. 4
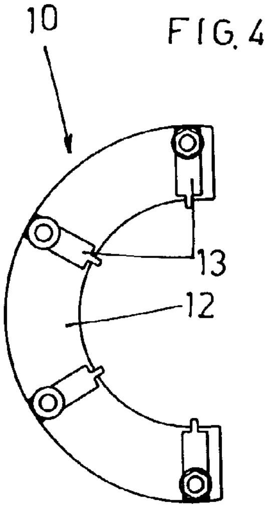

POSITIONING DEVICE FOR A TUBULAR LABEL AT A PRE-ESTABLISHED HEIGHT FROM A BOTTLE BOTTOM IN A LABELLING MACHINE

CROSS-REFERENCE TO RELATED APPLICATION

This application is a National Stage entry of International Application No. PCT/EP2005/001989, filed Feb. 25, 2005, which in turn claims priority from Italian Patent Application No. PR2004A00017 filed Mar. 8, 2004, the entire specification claims and drawings of both of which are incorporated herewith by reference.

The present invention deals with a positioning device for a tubular label at a pre-established height from a bottle bottom in a labelling machine.

A labelling machine with tubular labels, as disclosed in Italian Patent Application N. PR2002A000049, filed by the same Applicant, is known.

In the above-described labelling machine, a tubular label is formed by winding a crop of heat-shrinking film on a cylindrical drum, on the upper base of which a bottle is placed.

The cylindrical drum is provided with a plurality of holes through which a vacuum can be created in order to restrain the label during its transfer around the drum and during the welding step of the two overlapped edges, or a pressure to move the formed label away from the drum itself to allow the bottle to penetrate inside the label by lowering the drum on which the bottle rests.

In the briefly-described patent application, the label is always placed starting from the bottle bottom, since the label is abutted onto the cylindrical drum base, base on which the bottle also abuts.

Object of the present invention is positioning a label at a predetermined height from the bottle bottom and keeping said position during the bottle transfer step from the labelling machine to one or more conveyors, for example of the star type, in which the partial heat-shrinkage and thereby the stable securing of label to bottle occurs.

This object is fully obtained by the device for positioning a tubular label at a pre-established height from a bottle bottom in a labelling machine, subject of the present invention, which is characterized for what is provided by the below-listed claims.

Characteristics and advantages will be better pointed out by the following description of two embodiments, shown merely as a non-limiting example, in the enclosed tables of drawing in which:

FIGS. 1, 2 and 3 respectively show in a plan view, an elevation view and a perspective view a positioning device according to a first embodiment;

FIGS. 4, 5 and 6 respectively show in a plan view, an elevation view and a perspective view a positioning device according to a further embodiment;

With reference to FIGS. 1, 2 and 3, 1 designates as a whole a first embodiment of the device with a plurality of small vertical walls 2 arranged according to a semi-circle on a collar 3 adapted to be secured to the upper base of the winding drum 5, as shown in FIG. 4.

Figure 7:
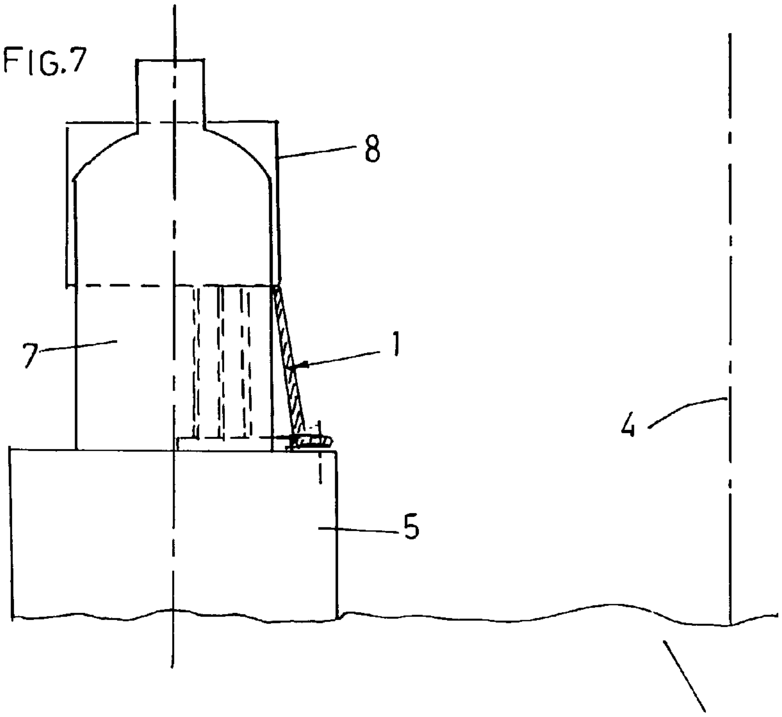
FIG. 7 shows a label forming drum arranged for housing a label positioning device.
Figure 9:
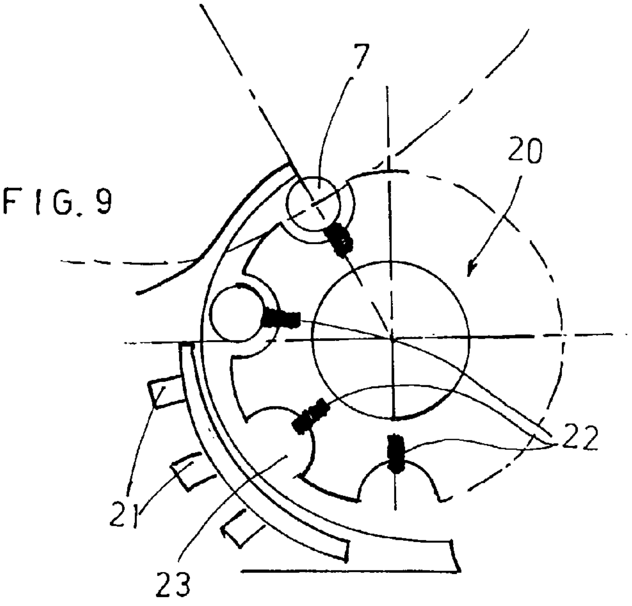
FIG. 9 shows the means for keeping of FIG. 8 in a plan view.
Figure 8:
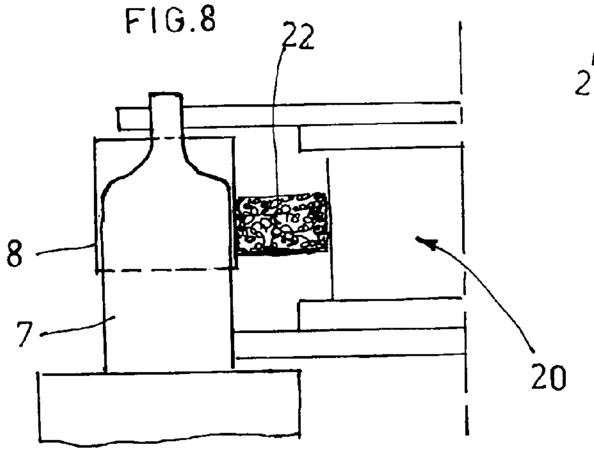
FIG. 8 is a schematic elevation view of the means for keeping the position established by the positioning device during a bottle transfer step on a star conveyor where a first heat-shrinkage step occurs.

The collar 3 is placed over the drum 5 from the part of the turntable rotation axis 4 on which a plurality of drums are assembled, in such a way as to allow transferring the bottle 7 from the drum to an outlet star conveyor 6 shown in FIGS. 8 and 9. The small vertical walls elastically adhere on the top to the external surface of the bottle 7 to create a stop on which the lower label 8 edge abuts.

The whole piece is preferably made of a plastic material in order to guarantee an elastic adaptation condition to external and variable bottle surfaces even when they are not with a vertical generatrix.

Another type of mechanical stopper for label positioning is the one shown in FIGS. 4, 5 and 6 and designated as a whole as 10.

This positioning device 10 provides for two vertical pins 11 of a predetermined height that are secured to the drum.

The vertical pins 11 support a semi-circle bracket 12 on which limit switches 13 are radially secured and get in contact with the bottle to determine a bearing plane of the lower edge of the tubular label. The internal diameter of the semi-circle bracket and the limit switch position must be such as to allow the vertical bottle movement. Limit switches are preferably made of plastic material.

Both devices 1 and 10 are fixtures that must be replaced depending on the height at which the label must be applied with respect to the bottle bottom; in particular, in the device 10, the pins 11 will have to be replaced for adjusting the bottle positioning height and the semi-circle bracket 12 depending on the bottle diameter.

When the bottle format changes, all positioning devices must be manually replaced, but, according to a possible variation not shown, label-stopper devices could be provided, assembled on means that allow their movement along two Cartesian axes, one approaching or going away from the drum rotation axis and one according to a vertical axis parallel to the drum axis.

In this way, with a single command, it could be possible to automatically adjust the position of the positioning device depending on the bottle format change.

For this arrangement, the device 10 could be advantageously used, and, instead of being secured to the drum, it will be supported by a bracket of the two above-mentioned movements.

With reference to FIGS. 8 and 9, means will be described that are adapted to keep the label position during the transfer step of the vessel from the labelling machine to a star conveyor 20 on which hot air jets 21 operate in order to perform a first heat-shrinkage that is enough to keep the label in position during the following passage into a heating tunnel where the final blocking of the label onto the vessel occurs.

Such means are substantially composed of resilient members 22, such as for example sponge pads 22, supported by the rotating part of the star conveyor and fitted into the area of the star pits 23.

Such pads 22 slightly press the label fitted onto the bottle.

The resilient holding members could be composed of a small pneumatic piston, whose stem slightly presses the label or other types of deformable friction members, for example leaf springs or the like.

The invention claimed is:

1. Device for positioning a tubular label at a pre-established height from a bottle bottom in a rotating labelling machine of a type equipped with a tubular label winding drum around which the tubular label is formed, and adapted to support the bottle to be labelled on an upper base, said drum being able to vertically translate in order to take the bottle inside the formed tubular label, the device providing stopper members of a lower label edge; said stopper members being placed in a semi-circle at a pre-established height from the bottle bottom when the bottle is housed on the tubular label winding drum, the semi-circle diameter having to be such as to allow the vertical bottle translation during a bottle transfer step into the formed tubular label and to guarantee an elastic adaptation condition to the external and variable bottle surfaces, the stopper members of the lower label edge comprising a plurality of small vertical walls arranged as a semi-circle on a collar adapted to be secured to the upper base of the winding drum, the small vertical walls elastically adhering on the top to the external surface of the bottle to create a stop on which the lower label edge abut; the small vertical walls arranged as a semi-circle being suitable for a lateral extraction of the bottle.

2. Device according to claim 1, characterized in that it provides stopper members secured to a bottle supporting drum base.

3. Device according to claim 1, characterized in that it comprises, in combination with label stopper members, means for keeping the position during the bottle transfer step from the labelling machine to a conveyor in which a first heat-shrinkage step occurs that is enough to keep the label in position for a final heat-shrinking step.

4. Device according to claim 3, characterized in that it provides elastic members for holding in position labels fitted onto the bottles in turn inserted in pits of a star conveyor.

5. Device for positioning a tubular label at a pre-established height from a bottle bottom in a rotating labelling machine of a type equipped with a tubular label winding drum around which the tubular label is formed, and adapted to support the bottle to be labelled on an upper base, said drum being able to vertically translate in order to take the bottle inside the formed tubular label, the device providing stopper members of a lower label edge; said stopper members being placed in a semi-circle at a pre-established height from the bottle bottom when the bottle is housed on the tubular label winding drum, the semi-circle diameter having to be such as to allow the vertical bottle translation during a bottle transfer step into the formed tubular label and to guarantee an elastic adaptation condition to the external and variable bottle surfaces, the stopper members providing for two vertical pins of a predetermined height that can be fixed to the upper base of the winding drum or to a bracket equipped with at least two movements along Cartesian axes, the vertical pins supporting a semi-circle bracket on which limit switches being radially secured and getting in contact with the bottle to determine a bearing plane of the lower edge of the tubular label; the semi-circle bracket defining a lateral aperture suitable for a lateral extraction of the bottle.

6. Device according to claim 5, characterized in that it comprises, in combination with label stopper members, means for keeping the position during the bottle transfer step from the labelling machine to a conveyor in which a first heat-shrinkage step occurs that is enough to keep the label in position for a final heat-shrinking step.

7. Device according to claim 5, characterized in that it provides elastic members for holding in position labels fitted onto the bottles in turn inserted in pits of a star conveyor.

8. Device according to claim 6, characterized in that it provides elastic members for holding in position labels fitted onto the bottles in turn inserted in pits of a star conveyor.

9. Device for positioning a tubular label at a pre-established height from a bottle bottom in a rotating labelling machine of a type equipped with a tubular label winding drum around which the tubular label is formed, and adapted to support the bottle to be labelled on an upper base, said drum being able to vertically translate in order to take the bottle inside the formed tubular label, the device providing stopper members of a lower label edge; said stopper members being placed in a semi-circle at a pre-established height from the bottle bottom when the bottle is housed on the tubular label winding drum, the semi-circle diameter having to be such as to allow the vertical bottle translation during a bottle transfer step into the formed tubular label and to guarantee an elastic adaptation condition to the external and variable bottle surfaces, the stopper members providing for at least two pins of a predetermined height that can be fixed to the upper base of the winding drum or to a bracket equipped with at least two movements along Cartesian axes, the pins supporting a semi-circle bracket on which limit switches being radially secured and getting in contact with the bottle to determine a bearing plane of the lower edge of the tubular label, the semi-circle bracket defining a lateral aperture suitable for a lateral extraction of the bottle.

10. Device according to claim 9, characterized in that it comprises, in combination with label stopper members, means for keeping the position during the bottle transfer step from the labelling machine to a conveyor in which a first heat-shrinkage step occurs that is enough to keep the label in position for a final heat-shrinking step.

11. Device according to claim 9, characterized in that it provides elastic members for holding in position labels fitted onto the bottles in turn inserted in pits of a star conveyor.

12. Device according to claim 10, characterized in that it provides elastic members for holding in position labels fitted onto the bottles in turn inserted in pits of a star conveyor.

* * * * *